US009228907B2

(12) United States Patent
Salo et al.

(10) Patent No.: US 9,228,907 B2
(45) Date of Patent: Jan. 5, 2016

(54) FLEXIBLE DEVICE DEFORMATION MEASUREMENT

(71) Applicant: Nokia Corporation, Espoo (FI)

(72) Inventors: Antti Salo, Lohja (FI); Matti Kosonen, Jarvenpaa (FI)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 14/080,376

(22) Filed: Nov. 14, 2013

(65) Prior Publication Data
US 2015/0128728 A1     May 14, 2015

(51) Int. Cl.
| | |
|---|---|
| *G01L 1/04* | (2006.01) |
| *G01L 1/14* | (2006.01) |
| *G01L 1/12* | (2006.01) |
| *G06F 3/0487* | (2013.01) |
| *G06F 1/16* | (2006.01) |
| *G06F 3/01* | (2006.01) |
| *G06F 3/041* | (2006.01) |
| *H04M 1/02* | (2006.01) |
| *G01B 7/16* | (2006.01) |

(52) U.S. Cl.
CPC ... *G01L 1/04* (2013.01); *G01B 7/16* (2013.01); *G01L 1/12* (2013.01); *G01L 1/14* (2013.01); *G01L 1/142* (2013.01); *G06F 1/1626* (2013.01); *G06F 1/1641* (2013.01); *G06F 1/1652* (2013.01); *G06F 3/017* (2013.01); *G06F 3/0414* (2013.01); *G06F 3/0487* (2013.01); *H04M 1/0268* (2013.01); *G06F 2203/04102* (2013.01); *G06F 2203/04105* (2013.01)

(58) Field of Classification Search
CPC ........ G01B 11/16; G01B 11/18; G01B 7/16; G01N 2203/027; G01N 2203/0647; G01L 1/247; G01L 1/04; G01L 1/12; G06F 1/1626; G06F 1/1641
USPC .............. 73/862.381, 862.391, 862.626, 800
See application file for complete search history.

(56) References Cited

U.S. PATENT DOCUMENTS

| | | | | |
|---|---|---|---|---|
| 3,760,636 | A * | 9/1973 | Serry | 73/852 |
| 4,396,901 | A * | 8/1983 | Saitou et al. | 382/144 |
| 4,671,659 | A * | 6/1987 | Rempt et al. | 356/477 |
| 5,668,324 | A * | 9/1997 | Voss et al. | 73/800 |
| 5,749,984 | A * | 5/1998 | Frey et al. | 152/415 |
| 6,094,259 | A * | 7/2000 | Kamegawa | 356/32 |

(Continued)

FOREIGN PATENT DOCUMENTS

| | | |
|---|---|---|
| EP | 2028586 | 2/2009 |
| EP | 2315186 | 4/2011 |

(Continued)

OTHER PUBLICATIONS

Hong-Ki Kim, et al., "Transparent and Flexible Tactile Sensor for Multi Touch Screen Application with Force Sensing", Transducers 2009, pp. 1146-1149.

(Continued)

*Primary Examiner* — Max Noori
(74) *Attorney, Agent, or Firm* — Locke Lord LLP (57) ABSTRACT

Monitoring deformation of a flexible electronic apparatus. Changes in space within the apparatus between at least two measurement points are detected; and degree of deformation of the apparatus is determined based on the detected changes in the space within the apparatus between the at least two measurement points.

26 Claims, 6 Drawing Sheets

(56) References Cited

U.S. PATENT DOCUMENTS

| | | | |
|---|---|---|---|
| 6,196,061 B1* | 3/2001 | Adderton et al. | 73/105 |
| 6,460,418 B1* | 10/2002 | Hiyoshi | 73/800 |
| 7,020,972 B2* | 4/2006 | Graf et al. | 33/501.7 |
| 2002/0108447 A1* | 8/2002 | Burczyk et al. | 73/716 |
| 2004/0008191 A1 | 1/2004 | Poupyrev et al. | |
| 2005/0090743 A1* | 4/2005 | Kawashima et al. | 600/443 |
| 2007/0209447 A1* | 9/2007 | Christ et al. | 73/800 |
| 2010/0011291 A1 | 1/2010 | Nurmi | |
| 2010/0298032 A1 | 11/2010 | Lee et al. | |
| 2010/0315373 A1 | 12/2010 | Steinhauser et al. | |
| 2011/0016165 A1* | 1/2011 | Uejima | G06F 15/0225 708/141 |
| 2013/0286553 A1 | 10/2013 | Vanska et al. | |
| 2014/0168880 A1 | 6/2014 | Saila et al. | |
| 2015/0163338 A1* | 6/2015 | Salo | H04M 1/72527 455/557 |

FOREIGN PATENT DOCUMENTS

| | | |
|---|---|---|
| EP | 2466420 | 6/2012 |
| WO | WO2011117681 | 9/2011 |
| WO | WO2012051342 | 4/2012 |
| WO | WO2013093326 | 6/2013 |

OTHER PUBLICATIONS

Follmer, S. et al., "Jamming User Interfaces: Programmable Particle Stiffness and Sensing for Malleable and Shape-Changing Devices", UIST 12, Oct. 7-10, 2012, Cambridge, Massachusetts, USA, 10 pages.

International Search Report for International Application No. PCT/FI2014/050845, Date of Completion of Search: Jan. 15, 2015, 4 pages.

Written Opinion of the International Searching Authority for International Application No. PCT/FI2014/050845, Date of Completion of Opinion: Jan. 15, 2015, 12 pages.

* cited by examiner

FLEXIBLE DEVICE DEFORMATION MEASUREMENT

TECHNICAL FIELD

The present invention generally relates to flexible electronic devices and especially but not exclusively to measuring deformation of flexible electronic devices.

BACKGROUND ART

Electronic devices can be made of elastic, flexible or bendable material thereby enabling production of flexible electronic devices. Flexible electronic devices can be made of rigid materials, too. For example combining many rigid parts with joints like in a caterpillar chain results in a flexible structure that can be used to produce flexible electronic devices. Flexible electronic devices may comprise functionality that is controlled by deforming the device.

SUMMARY

According to a first example aspect of the invention there is provided a method comprising
    monitoring deformation of a flexible electronic apparatus;
        wherein said monitoring of deformation comprises
    detecting changes in space within the apparatus between at least two measurement points; and
    determining degree of deformation of the apparatus based on the detected changes in the space within the apparatus between the at least two measurement points.

According to a second example aspect of the invention there is provided an apparatus an apparatus structure configured to allow deformation of the apparatus;
    detection equipment configured to detect changes in space within the apparatus between at least two measurement points; and
    a processing unit configured to determine degree of deformation of the apparatus based on the detected changes in the space within the apparatus between the at least two measurement points.

According to a third example aspect of the invention there is provided a computer program product comprising computer code for causing determining degree of deformation of a flexible electronic apparatus based on changes detected in space within the apparatus between at least two measurement points, when executed by an apparatus. Additionally, in further examples, the computer program product comprises computer code for causing performing the method of one or more example embodiments of the invention, when executed by an apparatus.

According to a fourth example aspect of the invention there is provided a non-transitory memory medium comprising the computer program of the third example aspect of the invention.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

Some example embodiments of the present invention and potential advantages are understood by referring to FIGS. 1a through 9 of the drawings.

A flexible electronic device may be (temporarily) deformed into a different shape by the user of the device. A neutral position of the device is typically flat. The device can be deformed into many different shapes such as concave, convex, twisted, S- and Z-shape, J- and L-shape for example. One device may be configured to be deformed into one or more different shapes.

In an example embodiment a flexible device is configured to be controlled by deforming the device. The device can be controlled to take certain action for example by bending or twisting the device into different shapes (different shapes causing the device to perform different actions). A user may for example bend the device to zoom or twist the device to browse lists. Such functionality requires determining degree of deformation of the device so that it can be determined which action to take. For example the direction and amount of deformation of the device need to be known to enable such kinetic controlling (controlling by deforming the device) of the device.

A flexible device structure can comprise several functional layers and/or components. Such layers usually have limited ability to stretch and compress. When an object bends or twists, the portions furthest away from a neutral plane need to stretch or compress the most. It is more difficult to bend one thick object than an equally thick stack of several thin objects. Thin objects would also experience less stress than the thick object. Therefore, it can be more feasible to allow two or more of thin layers of a flexible device to slide against each other than tie them together into one thick object. In an example embodiment there is provided an apparatus comprising two or more parallel plates or layers that are allowed to move in relation to each other in parallel direction to allow deformation of the apparatus.

Deformation detection in flexible devices can be implemented by using one or more of the following: resistive sensors e.g. flexion sensors, strain gauges, piezoelectric components and piezoelectric films. Common to these measurements is that he sensor itself bends together with the bended device and the sensor has to face the strains and stresses that are created due to deformation of the device. Therefore the cyclic durability of the sensors is limited. All of these measurement methods are not necessarily suited for use in mobile devices or at least there is no miniaturized and mass manufactured driving circuitry available for all of these measurement methods. There is also a problem of reliably attaching the sensor to the deforming part both mechanically and electrically. Thus there is a need to develop further solutions for deformation detection of flexible devices and especially solutions that suit flexible mobile devices, such as mobile phones, tablets and other handheld and movable user devices.

According to an example embodiment of the invention deformation sensing or monitoring of a flexible device is implemented by detecting changes in space within the device (e.g. between certain measurement points or between/within certain parts of the device) during deformation of the device and by determining a degree of deformation of the device (i.e. determining the shape of the device) on the basis of these changes. In an example embodiment the measurement points mentioned herein refer to physically different locations in space. In an alternative example, the measurement points refer to different measurement points in time domain.

In an embodiment the changes in space are detected by measuring relative movement of parts of the device or relative movement of certain measurement points in relation to each other. For example relative movement (e.g. sliding) of device covers or layers forming the device is detected or relative movement of measurement points on opposite surfaces of one apparatus part or structure is detected.

In an embodiment the changes in space are detected by measuring changes in gaps (or changes in distance) between rigid components or parts, between rigid and flexible components or parts, between flexible components or parts and/or within elastic material, or between certain measurement points.

In an embodiment the changes in space are detected by detecting a gap or a contact between rigid components or parts, between rigid and flexible components or parts, between flexible components or parts and/or within elastic material, and/or by detecting gaps or contacts on a cover of a device, and/or gaps or contacts between certain measurement points.

In an embodiment the changes in space are detected by measuring forces experienced between parts of the device or within elastic material, or between certain measurement points.

In an embodiment contactless measurement is used for detecting the changes in the space within an apparatus. For example magnet(s) and magnetometer(s) are used. Alternatively capacitive or inductive measurement is used. A skilled person understands that also other contactless measurement techniques can be used.

In an example embodiment, an apparatus comprises a touch screen and the touch screen is used for deformation sensing. Capacitive environment of the touch screen is likely to change due to deformation of the apparatus and this change can be used for detecting the deformation. In an example embodiment a grounded metal plane is placed at least partly below the touch screen on a separate layer that slides in relation to the capacitive touch screen when the apparatus is deformed. In this way it is ensured that a change takes place in the capacitive environment of the touch screen during deformation of the apparatus. In this way the existing touch screen can be utilized for implementing capacitive sensing. In an example embodiment, there would be one measurement point in a touch screen electrode grid and another measurement point somewhere in the surroundings of the touch screen (e.g. on a layer below the touch screen). Changes in the space between these measurement points (e.g. changes in capacitive properties between the measurement points) would then be detected and used for determining degree of deformation of the apparatus.

Figures 1A, 1B:
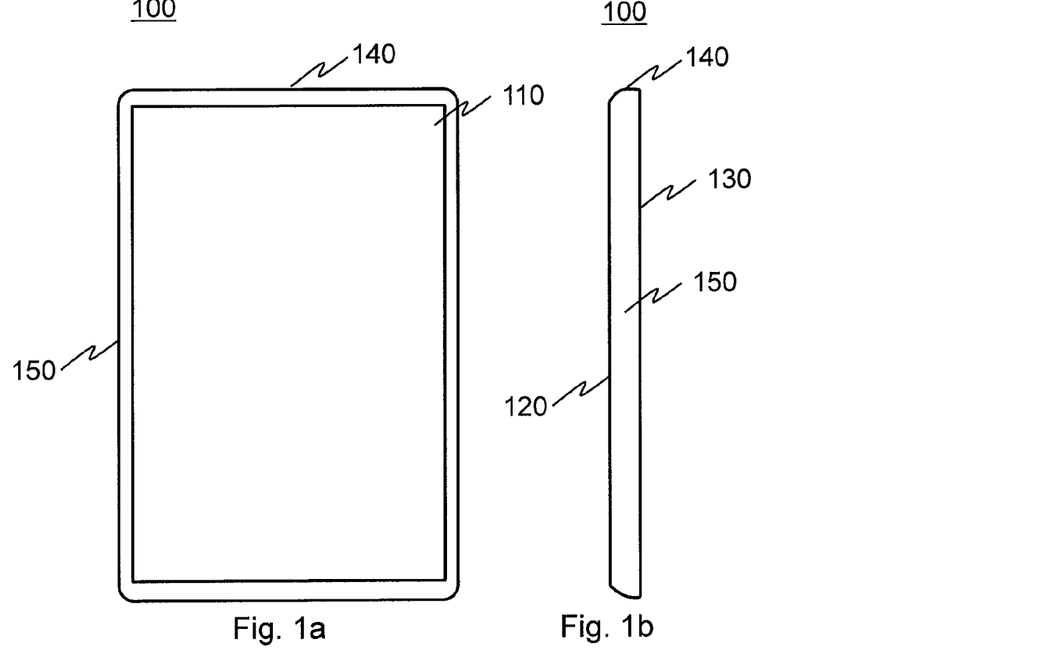
FIG. 1a shows a schematic front view of an apparatus according to an example embodiment of the invention.
FIG. 1b shows a schematic side view of an apparatus according to an example embodiment of the invention.

FIG. 1a shows a schematic front view of an apparatus 100 according to an example embodiment of the invention and FIG. 1b FIG. 1a shows a schematic side view of the apparatus 100 according to an example embodiment of the invention. The apparatus 100 is for example a tablet computer, a personal digital assistant, a smartphone, a media player, an e-book reader, a display or a flat-screen television. The apparatus 100 according to an example embodiment, comprises a user interface unit 110, such as a touch sensitive display at least on one surface of the apparatus. In an example embodiment, the apparatus comprises a front surface 130, a back surface 120, and four sides 140, 150. In an example embodiment, the apparatus 100 is substantially rectangular.

The touch sensitive display 110 comprises a touch sensor for detecting the touch of the user on or in proximity thereof. In an example embodiment, the touch sensor comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof. A skilled person appreciates that the user interface unit, in a further example embodiment, comprises further elements such as hardware or soft buttons or further display units. In a further example embodiment, the user interface unit 110 is covered with a glass window. In a further example embodiment, the apparatus 100 is controlled with further methods such as by voice recognition, by tracking eye movement of the user, by recognizing facial expressions of the user, or by recognizing movements or gestures of the user.

Figure 2:
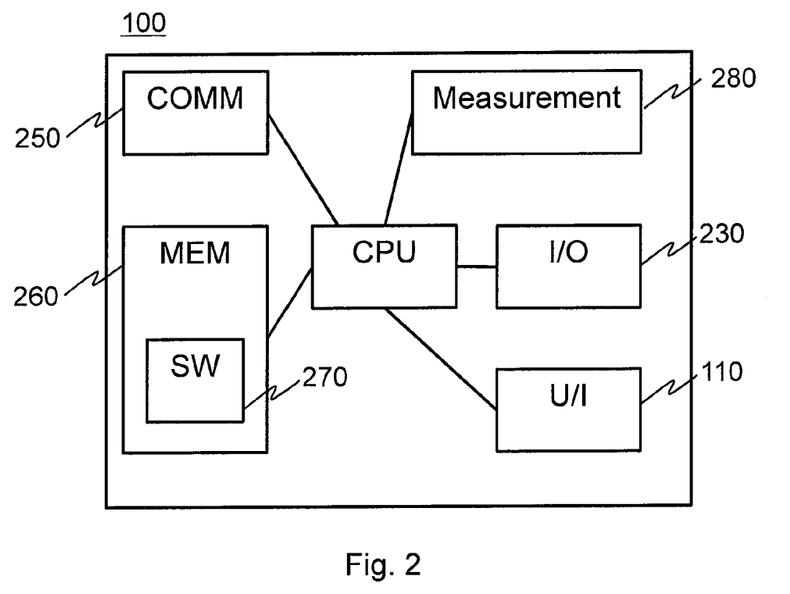
FIG. 2 shows a schematic block diagram of an apparatus according to an example embodiment of the invention.

FIG. 2 shows a schematic a block diagram of an apparatus 100 of an example embodiment. The apparatus 100 comprises a communication interface module 250, a processor 240 coupled to the communication interface module 250, and a memory 260 coupled to the processor 240. The apparatus further comprises an input/output (I/O) unit 230, a measurement unit 280, and a user interface (U/I) unit 110, such as a touch sensitive display, which are coupled to the processor 240.

The memory 260 comprises a work memory and a non-volatile memory such as a read-only memory, flash memory, optical or magnetic memory. In the memory 260, typically at least initially in the non-volatile memory, there is stored software 270 operable to be loaded into and executed by the processor 240. The software 270 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

It shall be understood that any coupling in this document refers to functional or operational coupling; there may be intervening components or circuitries in between coupled elements unless expressly otherwise described.

The communication interface module 250 is configured to provide local communications over one or more local links. The links may be wired and/or wireless links. The communication interface 250 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 250 may be integrated into the apparatus 100 or into an adapter or card that may be inserted into a suitable slot or port of the apparatus 100. While FIG. 2 shows one communication interface 250, the apparatus may comprise a plurality of communication interfaces 250. In a further example embodiment, the apparatus 100 further comprises a near field communication (NFC) unit.

The measurement unit 280 is configured to perform measurements used for detecting deformation (i.e. detecting changes in shape or form) of the apparatus 100. In an example embodiment the measurement unit 280 is configured to measure changes in space within the apparatus, such as for example changes in distances between or within parts of the apparatus or changes in space between at least two measurement points. In an example embodiment the measurement unit 280 comprises at least one magnet and magnetometer pair. In another embodiment the measurement unit 280 comprises at least one inductive or capacitive sensor. In an example embodiment a touch screen comprised in the user interface unit 110 operates as the measurement unit 280 by measuring changes in capacitive environment.

The processor 240 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 240, but the apparatus 100 may comprise a plurality of processors. In an example embodiment the processor 240 is configured to process measurement results provided by the measurement unit 280 to detect deformation of the apparatus. Alternatively the measurement unit can comprise functionality configured to process the measurement results and to inform the processor 240 that deformation of the apparatus has occurred. In an example embodiment, the processor is configured to, in response to the apparatus being bent or otherwise deformed to change an operating mode of the apparatus, e.g. from a power-saving mode to a browsing mode, or to receive user input or to take some other action.

As mentioned in the foregoing, the memory 260 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage or a smart card. In some example embodiments, only volatile or non-volatile memory is present in the apparatus 100. Moreover, in some example embodiments, the apparatus comprises a plurality of memories. In some example embodiments, various elements are integrated. For instance, the memory 260 can be constructed as a part of the apparatus 100 or inserted for example into a slot or a port. Further still, the memory 260 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 100 may comprise other elements, such as microphones, displays, as well as additional circuitry such as a camera unit, further input/output (I/O) circuitries, memory chips, application-specific integrated circuits (ASIC), processing circuitry for specific purposes such as source coding/decoding circuitry, channel coding/decoding circuitry and ciphering/deciphering circuitry. Additionally, the apparatus 100 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 240.

Figure 3A:
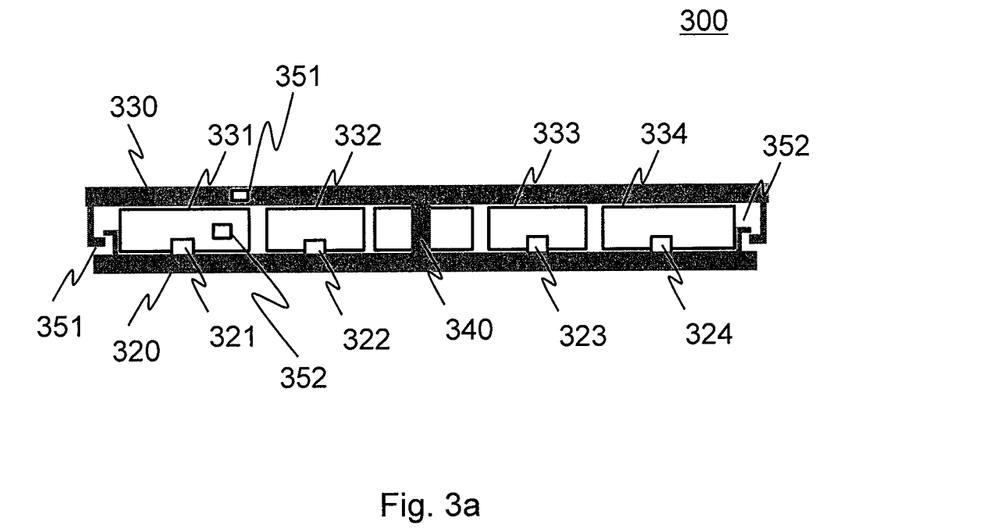
FIG. 3a shows a cross-sectional side view of an apparatus according to an example embodiment of the invention in an unbent position.
Figure 3B:
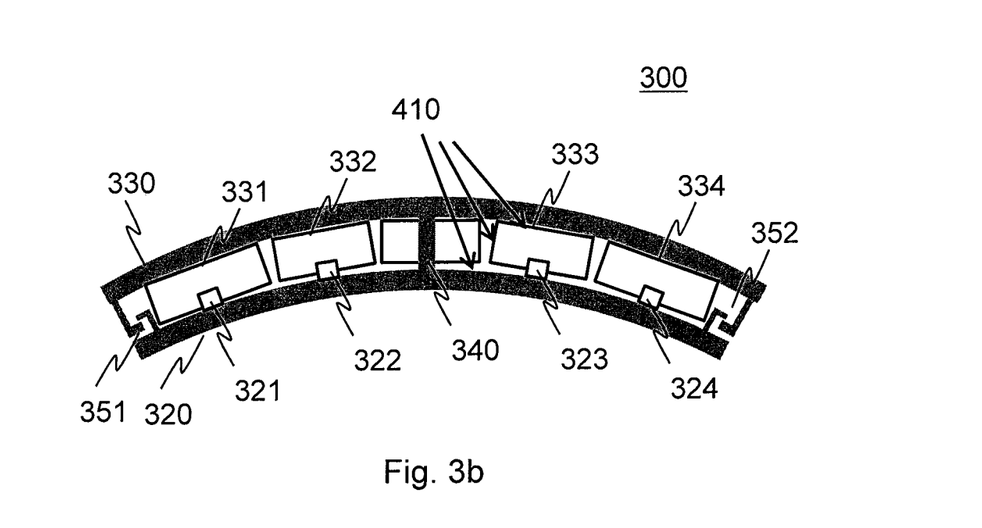
FIG. 3b shows a cross-sectional side view of an apparatus according to an example embodiment of the invention in a bent position.

FIGS. 3a and 3b show a schematic side view of an apparatus according to an example embodiment of the invention in an unbent and in a bent position, respectively. The apparatus comprises a front or top cover or an A-cover 330 and a back or bottom cover or a B-cover 320. A pillar 340 and sliding contacts 351 and 352 join the covers 320 and 330 together so that parallel movement of the covers in relation to each other is allowed. The covers 320 and 330 fully or partially comprise flexible structure thereby enabling deformation of the apparatus by a user. The flexibility may be provided by use of elastic or resilient material or by a mechanical structure (such as a tab-and-hole structure shown in FIG. 7 or a caterpillar like structure made of chained mechanical parts) allowing changing the shape of the structure. The covers 320 and 330 can be made of plastic, thin glass, thin metal or elastomer for example.

The apparatus 300 further comprises electrical components 331-334 attached to the B-cover 320 by attachments 321-324. The electrical components can comprise for example battery, printed wiring board (PWB). The attachments may be for example screws or other joining elements. In an example embodiment the electrical components are rigid components. Alternatively some or all of the electronic components can be resilient or elastic. A skilled person appreciates that in an example embodiment, the front, or top, cover of the apparatus 300 comprises a touch screen or display and possibly further structures (not shown for intelligibility). A skilled person appreciates that in an example embodiment, some or all of the electrical components are attached to the A-cover 330 instead of the B-cover 320.

In an example embodiment the apparatus 300 comprises a resilient internal structure (not shown) in the space between the covers 320 and 330. The resilient internal structure comprises in an example embodiment resilient materials, such as a gel, an elastomer, foam, rubber or silicone. In a further example embodiment, the resilient internal structure comprises in addition or instead of a resilient material resilient structures such as hollow, woven, folded or coiled structures, or a folding membrane of e.g. thin polymer of fabric.

When the apparatus 300 is bent as shown in FIG. 3b distance 410 between the electrical components 331-334 and the covers 320 and 330 changes. In an example embodiment the apparatus comprises one or several capacitive/inductive sensors configured to measure changes in these distances, i.e. to measure changes in space between the parts of the apparatus 300. These changes can then be used for defining the shape of the apparatus 300 at a particular moment.

FIG. 3a shows a pair of measurement devices, one measurement device 352 residing in electrical component 331 and another measurement device 351 residing in the A-cover 330. In an example embodiment these measurement devices are configured to be used for determining changes in space or distances between the parts of the apparatus 300 or changes in space within the apparatus 300 and the changes can then be used for defining the shape of the apparatus 300 at a particular moment.

In an example embodiment the measurement device 352 is a magnetometer and the measurement device 351 is a magnet. A skilled person understands that instead of one magnet-magnetometer pair the electronic components 331-334 may comprise one or several magnetometers and the A-cover 330 may comprise one or several magnets. In another embodiment, the measurement device 352 is a coil of an inductive sensor and measurement device 351 is a conductive counterpart of the inductive sensor. In another embodiment, the measurement device 352 is an electrode of a capacitive sensor and measurement device 351 is a second electrode of the capacitive sensor or a conductive counterpart of the capacitive sensor.

For the sake of clarity only one measurement device pair is shown in FIG. 3a, but a skilled person understands that there may exist plurality of measurement devices and that they are not necessarily implemented in even pairs. Instead, there may exist for example different number of magnets and magnetometers.

Further it is noted that although FIG. 3a shows the measurement devices residing in different parts of the apparatus, a skilled person understands that, in some other example, equal measurement devices can be used for measuring changes between some other measurement points, too. As an example such measurement points may reside on different surfaces of one part or apparatus structure.

Figure 4A:
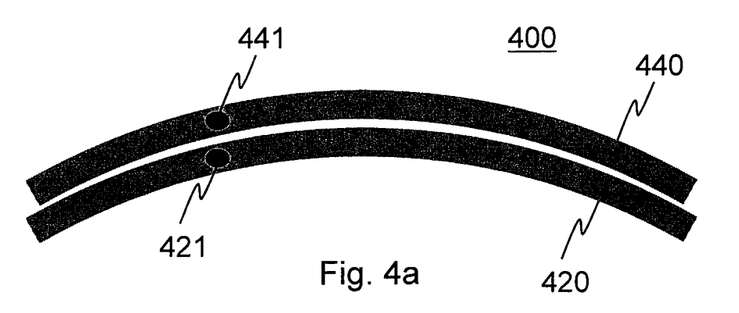
FIG. 4a shows a cross-sectional side view of an apparatus according to an example embodiment of the invention in a slightly bent position.
Figure 4B:
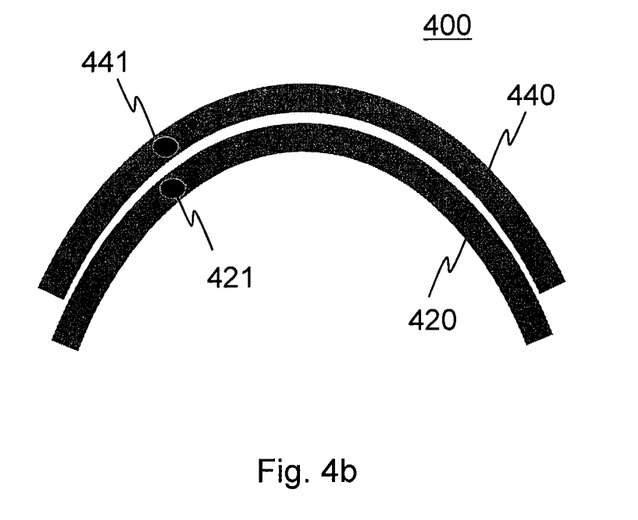
FIG. 4b shows a cross-sectional side view of an apparatus according to an example embodiment of the invention in a strongly bent position.

FIG. 4a shows a cross-sectional side view of an apparatus 400 according to an example embodiment of the invention in a slightly bent position. The apparatus comprises two layers 440 and 420 that are configured to slide in relation to each other as the apparatus is deformed (e.g. bent). The layers 440 and 420 comprise measurement points 441 and 421 that comprise measurement devices configured to measure or detect changes in space between the measurement points, such as movements of the layers in relation to each other. FIG. 4b shows the apparatus 400 of FIG. 4a in a strongly bent position. It can be seen that the distance between the measurement points 441 and 421 in FIG. 4b is different from the respective distance in FIG. 4a. In an example embodiment, changes in this distance are used for detecting deformation of the apparatus.

It is noted that a skilled person understands that the apparatus 400 of FIGS. 4a and 4b can comprise more layers than the two that are shown. Additionally or alternatively, the layers can comprise components that are not shown in FIGS. 4a and 4b.

In an alternative embodiment the layers 440 and 420 of FIGS. 4a and 4b illustrate opposite surfaces of one flexible part. Also in this case apparatus deformation is detected on the basis of changes in space between the measurement points 441 and 421. In this case the changes in space between the measurement points 441 and 421 relate to movements of the surfaces 440 and 420 in relation to each other.

Figure 5:
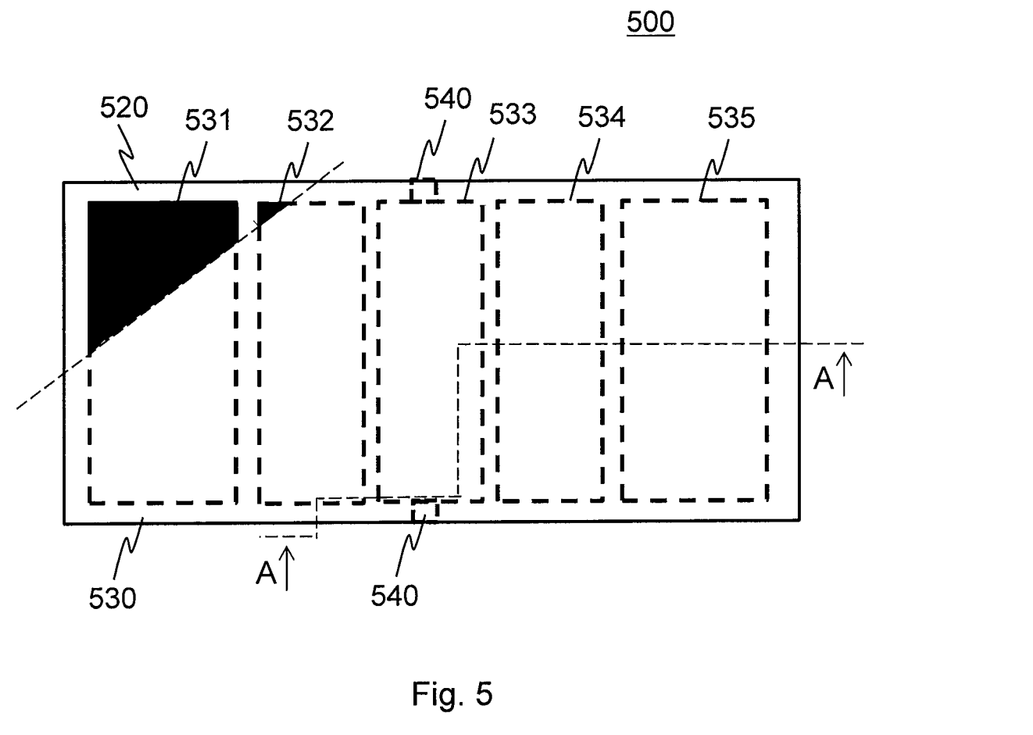
FIG. 5 shows a schematic front view of an apparatus according to an example embodiment of the invention.
Figure 6:
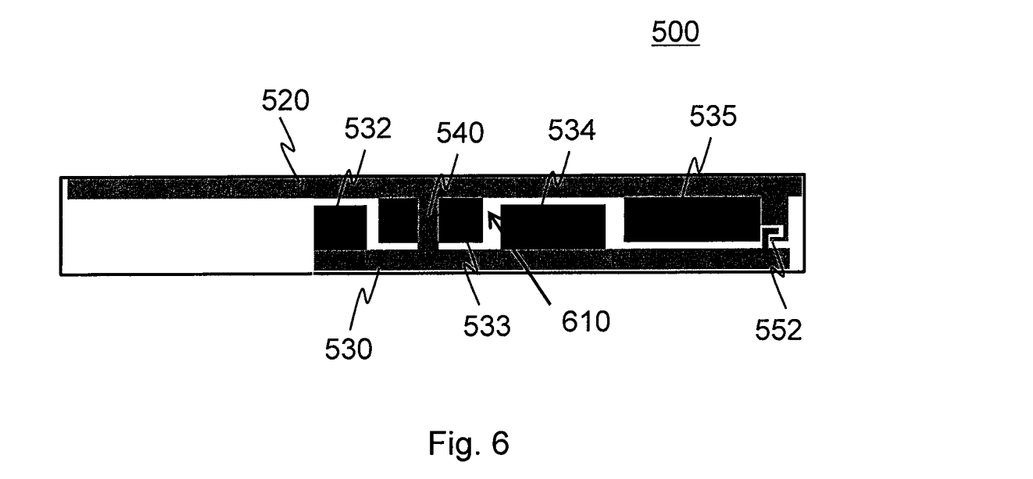
FIG. 6 shows a cross-sectional view across line A-A of the apparatus of FIG. 5.

FIG. 5 shows a schematic front view of an apparatus 500 according to an example embodiment of the invention and FIG. 6 shows a schematic cross sectional side view of the apparatus 500 across the line A-A shown in FIG. 5. The apparatus 500 is to some extent an alternative to the apparatuses 300 and 400 of FIGS. 3a-4b and a skilled person understands that any embodiment discussed in connection with FIGS. 3a-4b can be applied to the apparatus 500 as well. The apparatus 500 comprises a front or top cover or an A-cover 530 and a back or bottom cover or a B-cover 520. Pillars 540 and sliding contacts 552 join the covers 520 and 530 together.

The covers 520 and 530 fully or partially comprise flexible structure thereby enabling deformation of the apparatus by a user. The flexibility may be provided by use of elastic or resilient material or by a mechanical structure (such as a tab-and-hole structure shown in FIG. 7) allowing changing the shape of the structure.

The apparatus 500 further comprises electrical components 531-535 inside the apparatus in the space formed between the covers 520 and 530. In an example embodiment the electrical components are rigid components. Alternatively some or all of the electronic components can be resilient or elastic. Components 532 and 534 are attached to the B-cover 520 and components 533 and 535 are attached to the A-cover 530.

Similarly to the example shown in FIGS. 3a and 3b, in an example embodiment the apparatus 500 comprises a resilient internal structure (not shown) in the space between the covers 520 and 530. In an example embodiment, as the apparatus is deformed, elastic material in gap 610 compresses against the components 533 and 534 and degree of deformation of the apparatus is determined on the basis of measured forces, strain, surface pressure or fluid pressure experienced within the apparatus 500. There may be for example a pressure sensor configured to measure the forces or other suitable sensor. In an example embodiment there is, within the apparatus, a gas or liquid tight cavity that changes it's volume in response to the deformation of the apparatus. In this way, a fluid pressure measurement is enabled and changes in space within the apparatus can be detected by detecting changes in pressure experienced by the gas or fluid within the cavity.

In various example embodiments, changes in space between at least two measurement points are detected. Especially in the example embodiments relating to measuring changes in forces or pressures, the measurement points are not necessarily different physical locations but different points in time domain. That is, there may be only one physical measurement point and different measurement points between which the changes are detected are different points of time.

A skilled person understands that an apparatus according to some embodiments of the invention may be formed by two or more parallel plates, such as the covers 320, 330, 520 and 530 of FIGS. 3-6, that are joined together with one or more joints that allow parallel movement of the plates and limit separation of the plates (especially separation in vertical direction but to some extent also separation in parallel direction). Any components placed inside the apparatus are allowed to move in relation to at least one of the parallel plates.

Figure 7:
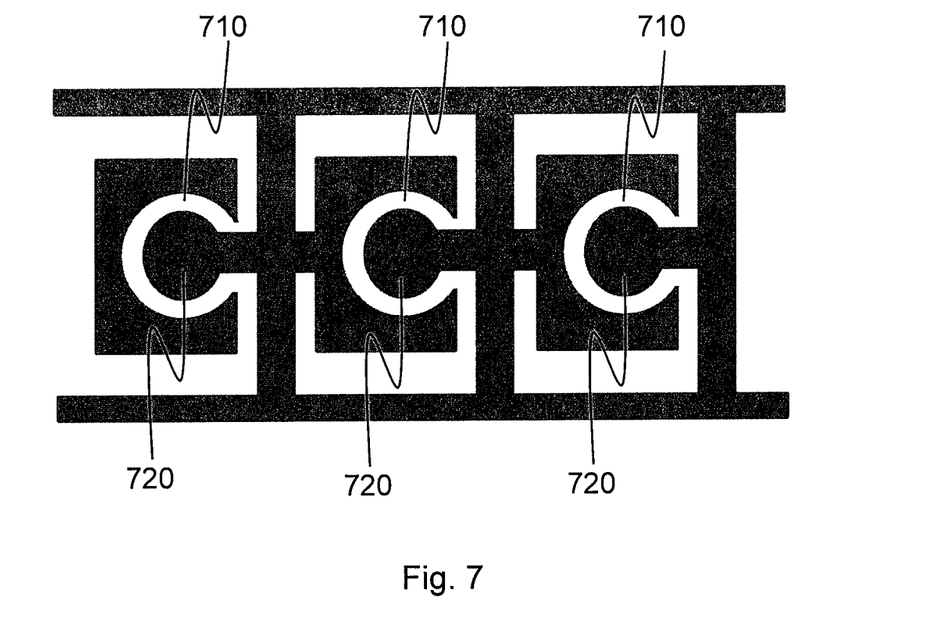
FIG. 7 shows a schematic view of a tab-and-hole structure.

FIG. 7 shows a schematic view of a tab-and-hole structure. The structure comprises a plurality of tabs 720 loosely fitted into holes 710. Loose fitting of the tabs allows bending or twisting the structure without breaking it. The structure can be made of a rigid or resilient material.

Figure 8:
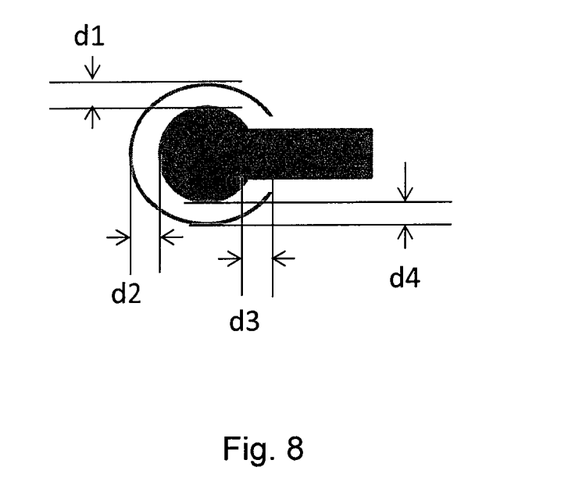
FIG. 8 illustrates measurements according to an example embodiment of the invention in a tab and hole structure.

FIG. 8 illustrates measurements according to an example embodiment of the invention in a tab-and-hole structure. Distances d1-d4 indicate position of the tab in the respective hole and measuring these distances and detecting any changes in these distances is used for determining degree of deformation of the structure (or an apparatus comprising the structure) in an embodiment of the invention.

Figure 9:
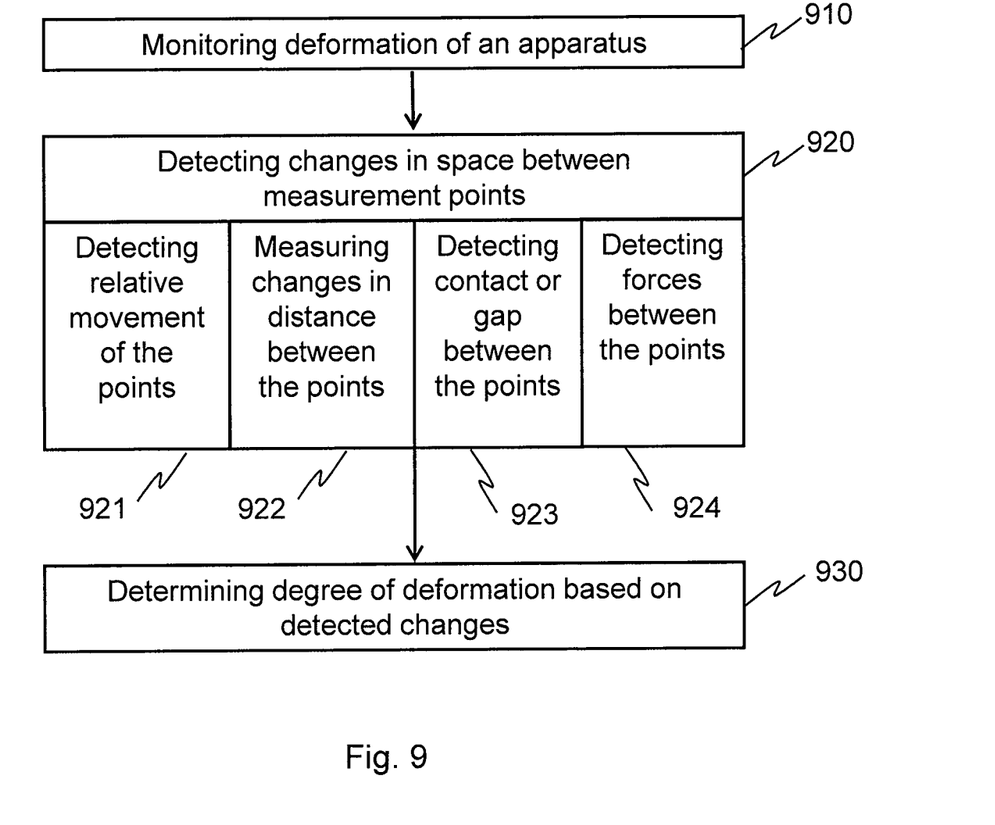
FIG. 9 shows a flow diagram illustrating a method according to an example embodiment of the invention.

FIG. 9 shows a flow diagram illustrating a method according to an example embodiment of the invention. The method may be performed for example by the apparatus 100, 300, 400 or 500 of previous Figures. In phase 910 of the method, the apparatus performs monitoring deformation of the apparatus. This monitoring is performed for example continuously when the apparatus is turned on or in use. The apparatus can comprise functionality to turn of this monitoring if desired, but such feature is not in any way mandatory.

In phase 920, changes in space within the apparatus are detected. For example changes in space between at least two measurement points are detected. Like mentioned in previous examples, the measurement points can reside in different parts comprised in the apparatus or on different surfaces of one part comprised in the apparatus. In the latter case the space between the measurement points can be fully within that one part of the apparatus. In that case changes within that part are detected or measured. One or more of the following mechanisms are used for detecting the changes:

921: Relative movements of the measurement points are detected or measured. Relative movement can be detected between different parts of the apparatus or between different surfaces of one part of the apparatus or between any two layers of one part of the apparatus.

922: Changes in gaps or distances between the measurement points are measured.

923: Appearance or existence of gaps or contacts between the measurement points is detected. A contact between measurement points refers to a situation in which the measurement points (e.g. parts of the apparatus comprising the measurement points) touch each other, i.e. the smallest distance between the measurement points is zero. If the smallest distance between the measurement points is larger than zero, there is a gap between the measurement points.

924: Forces or changes in forces experienced between the measurement points are detected. In different embodiments changes in forces between parts or within parts can be detected. Additionally or alternatively changes in pressure experienced between the measurement points can be detected.

A skilled person understands that also other mechanisms for detecting changes in space between the measurement points can be used instead of or in addition to the ones listed here.

In phase 930, the degree of deformation (e.g. direction and amount of deformation) is determined on the basis of the detected changes.

It is noted that the measurement points mentioned in various embodiments of the invention may reside on different parts of the apparatus. In an example embodiment the measurement points reside inside the apparatus. In an example embodiment at least one of the measurement points resides on a cover of the apparatus. In an example embodiment the measurement points reside on different (e.g. opposite) surfaces of one apparatus structure or part. In an example embodiment the measurement points reside on different parts of the apparatus. In an example embodiment the measurement points reside on different internal parts of the apparatus. In an example embodiment the measurement points reside within one part of the apparatus.

Without in any way limiting the scope, interpretation, or application of the claims appearing below, a technical effect of one or more of the example embodiments disclosed herein is to provide a durable solution for deformation detection. Solutions of various embodiments of the invention allow use of contactless measurement and thereby measurement sensors that have to experience the strains of the deformation in order to provide a measurement signal are not needed. That is, in various embodiments there is no need to strain the sensor that is used to detect deformation of the device. This is an advantage over using e.g. strain gauge sensors that tend to break every now and then because they experience the forces caused by the deformations. It is noted that a skilled person understands that even though measurements in certain embodiments of the invention concern measuring changes within a deforming part (e.g. distance between measurement points residing on opposite sides of a deforming part), the nature of the measurements is such that the measurement devices that are used do not need to strain or deform. Measurement in various embodiments can be performed on certain spots and measurements for the full length of the deforming structure are not needed.

Another technical effect of one or more of the example embodiments disclosed herein is cost reduction. Cost reduction is achieved for example due to not needing to implement electric connections for power an data lines in apparatus covers to measure the deformation. Another technical effect of one or more of the example embodiments disclosed herein is easy implementation as driving electronics for magnetometers and capacitive/inductive sensors are already used in mobile devices for other purposes. Another technical effect of one or more of the example embodiments disclosed herein is possibility to reduce the number of components that are needed in flexible devices. As an example a single magnet and a 2-axis magnetometer are able to measure deformations caused by bending and twisting. As a comparison, a minimum of three strain gauges are needed for the same measurement. Another technical effect of one or more of the example embodiments disclosed herein is easy integration as it is possible to use cost effective and small sensors that can be mounted directly on engine board of the device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
   monitoring deformation of a flexible hand-held mobile electronic apparatus, said apparatus comprising,
   a processing unit;
   at least one memory, the at least one memory having computer program code stored thereon;
   a communication interface configured to communicate data over at least one radio frequency connection; and
   a user interface configured to receive input from, and display output to, a user of the apparatus; wherein said monitoring of deformation comprises
   detecting changes in space within the apparatus between at least two measurement points; and
   determining a degree of deformation of the apparatus based on the detected changes in the space within the apparatus between the at least two measurement points.

2. A method according to claim 1, wherein said at least two measurement points reside in at least two different parts of the apparatus, wherein said at least two parts are configured to move in relation to one another to allow deformation of the flexible electronic apparatus.

3. A method according to claim 1, wherein said at least two measurement points reside on different surfaces of one deforming part of the apparatus.

4. A method according to claim 1, wherein said at least two measurement points reside inside the apparatus.

5. A method according to claim 1, wherein at least one of the two measurement points resides on a cover part of the apparatus.

6. A method according to claim 1, wherein said at least two measurement points are different points in time domain.

7. A method according to claim 1, wherein said detection of changes in space within the apparatus comprises detecting relative movement of the at least two measurement points in relation to one another.

8. A method according to claim 1, wherein said detection of changes in space within the apparatus comprises detecting a change in distance between the at least two measurement points.

9. A method according to claim 1, wherein said detection of changes in space within the apparatus comprises detecting a gap between the at least two measurement points.

10. A method according to claim 1, wherein said detection of changes in space within the apparatus comprises detecting a contact between the at least two measurement points.

11. A method according to claim 1, wherein said detecting of changes in space within the apparatus comprises detecting a change in forces experienced between the at least two measurement points.

12. A method according to claim 1, wherein said detection of changes in space within the apparatus comprises detecting changes in pressure experienced within the apparatus.

13. A method according to claim 1, wherein said apparatus comprises a cavity filled with any one of a fluid and a gas within the apparatus and said detection of changes in space within the apparatus comprises detecting changes in pressure experienced by any one of the fluid and the gas within the cavity.

14. A method according to claim 1, wherein the apparatus comprises elastic material between the at least two measurement points and said detection of changes in space within the apparatus comprises detecting changes within the elastic material.

15. A method according to claim 1, wherein said detection of changes in space within the apparatus is performed by using contactless measurement technology.

16. A method according to claim 1, wherein said apparatus comprises a touch screen and said detection of changes in space within the apparatus comprises detecting changes in capacitive environment of the touch screen.

17. A flexible hand-held mobile electronic apparatus comprising:
 a processing unit;
 at least one memory, the at least one memory having computer program code stored thereon;
 a communication interface configured to communicate data over at least one radio frequency connection;
 a user interface configured to receive input from, and display output to, a user of the apparatus;
 an apparatus structure configured to allow deformation of the apparatus;
 detection equipment configured to detect changes in space within the apparatus between at least two measurement points; and
 the processing unit configured to determine a degree of deformation of the apparatus based on the detected changes in the space within the apparatus between the at least two measurement points.

18. An apparatus according to claim 17, wherein said detection equipment is configured to detect changes in distance between the at least two measurement points.

19. An apparatus according to claim 17, wherein said detection equipment is configured to detect a change in forces caused between the at least two measurement points.

20. An apparatus according to claim 17, wherein said detection equipment comprises contactless measurement equipment.

21. An apparatus according to claim 17, wherein said detection equipment comprises at least one magnet and magnetometer pair.

22. An apparatus according to claim 17, wherein said detection equipment comprises at least one capacitive sensor.

23. An apparatus according to claim 17, wherein said detection equipment comprises at least one inductive sensor.

24. An apparatus according to claim 17, further comprising at least one touch screen configured to provide a user interface and said touch screen is configured to operate as the detection equipment and to detect changes in capacitive environment of the touch screen changes in space within the apparatus.

25. An apparatus according to claim 17, wherein the apparatus structure comprises a plurality of tabs loosely fitted into holes to allow deformation of the apparatus without breaking.

26. An apparatus according to claim 17, wherein the apparatus further comprises a top cover and a bottom cover, and wherein a pillar and sliding contacts join the covers to enable parallel movement of the covers in relation to one another.

* * * * *